United States Patent
Liu et al.

(10) Patent No.: US 10,127,219 B2
(45) Date of Patent: Nov. 13, 2018

(54) SYSTEM AND METHOD FOR ORGANIZING AND PROCESSING FEATURE BASED DATA STRUCTURES

(71) Applicant: Hong Kong Applied Science and Technology Research Institute Company Limited, Hong Kong (HK)

(72) Inventors: Yang Liu, Hong Kong (HK); Chao Feng, Hong Kong (HK); Cheuk Hang Chiu, Hong Kong (HK); Kangheng Wu, Hong Kong (HK); Zhi Bin Lei, Hong Kong (HK)

(73) Assignee: Hong Kong Applied Science and Technoloy Research Institute Company Limited, Hong Kong (HK)

( * ) Notice: Subject to any disclaimer, the term of this patent is extended or adjusted under 35 U.S.C. 154(b) by 0 days.

(21) Appl. No.: 15/374,479

(22) Filed: Dec. 9, 2016

(65) Prior Publication Data

US 2018/0165269 A1 Jun. 14, 2018

(51) Int. Cl.
*G06F 17/27* (2006.01)
*G06F 17/28* (2006.01)

(52) U.S. Cl.
CPC ........ *G06F 17/273* (2013.01); *G06F 17/2735* (2013.01); *G06F 17/2863* (2013.01)

(58) Field of Classification Search
CPC ........................... G06F 17/273; G06F 17/2735
See application file for complete search history.

(56) References Cited

U.S. PATENT DOCUMENTS 3,969,698 A * 7/1976 Bollinger ................ G06K 9/72
382/225
4,783,758 A * 11/1988 Kucera ................ G06F 17/273
400/63

(Continued)

FOREIGN PATENT DOCUMENTS

CN 103544309 A 1/2014
CN 103885938 A 6/2014

(Continued)

OTHER PUBLICATIONS

Schaback, Johannes, and Fang Li. "Multi-level feature extraction for spelling correction." IJCAI—2007 Workshop on Analytics for Noisy Unstructured Text Data. 2007.*

(Continued)

*Primary Examiner* — Brian L Albertalli
(74) *Attorney, Agent, or Firm* — Spruson & Ferguson (Hong Kong) Limited (57) ABSTRACT

A method for organizing and processing feature based data structures that can be used in linguistic spell checking and auto-correction, comprising: splitting an original dictionary into sub-dictionaries based on different values of a common feature such as high frequency words; receiving an input text that contains errors; determining a sub-dictionary selection feature from the input human-readable text; selecting the sub-dictionary based on the determined sub-dictionary selection feature; executing a first matching in the selected sub-dictionary, wherein a match is found if a similarity between the characters, words, or phrases in proximity of the errors in the input text and a character, word, or phrase in the sub-dictionary is above a threshold; if a unique match is found, the result is returned as an output to correct the errors; otherwise, executing a second matching with a raised thresh- (Continued)

old, and repeating the second matching until a unique match is found.

8 Claims, 4 Drawing Sheets

(56) References Cited

U.S. PATENT DOCUMENTS

| | | | | |
|---|---|---|---|---|
| 4,959,785 | A * | 9/1990 | Yamamoto | G06F 17/273 715/234 |
| 5,297,038 | A * | 3/1994 | Saito | G06F 17/273 |
| 5,774,588 | A * | 6/1998 | Li | G06F 17/273 382/229 |
| 6,023,536 | A | 2/2000 | Visser | |
| 6,424,971 | B1 | 7/2002 | Kreulen et al. | |
| 8,903,719 | B1 * | 12/2014 | Landry | G06F 17/21 704/10 |
| 9,275,019 | B2 * | 3/2016 | Weinberg | G06F 17/2211 |
| 2008/0244386 | A1 * | 10/2008 | Fux | G06F 17/273 715/257 |
| 2009/0171953 | A1 * | 7/2009 | Morris | G06F 17/2735 |
| 2012/0166942 | A1 | 6/2012 | Ramerth et al. | |
| 2014/0067371 | A1 * | 3/2014 | Liensberger | G06F 17/273 704/9 |
| 2014/0281943 | A1 * | 9/2014 | Prilepov | G06F 17/2735 715/257 |

FOREIGN PATENT DOCUMENTS

| | | |
|---|---|---|
| CN | 105447119 A | 3/2016 |
| CN | 105468719 A | 4/2016 |
| EP | 0564827 A2 | 10/1993 |

OTHER PUBLICATIONS

International Search Report and Written Opinion of PCT application No. PCT/CN2016/109860 issued from the International Search Authority dated Sep. 7, 2017.

* cited by examiner

SYSTEM AND METHOD FOR ORGANIZING AND PROCESSING FEATURE BASED DATA STRUCTURES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to methods and systems for organizing electronic data. More particularly, the present invention generally relates to applications and usage of electronic dictionaries, language error detection and corrections, such as spell checking and auto-correction.

BACKGROUND

The proliferation of mobile electronic devices allows the instantaneous collection of tremendous amount of digital data in our daily lives. Much of these digital data is meant to be processed and eventually be displayed in graphical and text formats, such as digital newsfeeds, instant image captures, and text messages. The processing that converts these raw digital data collected or captured in their binary and/or machine-readable formats into human-readable text may involve certain data decoding steps, other special conversion steps such as optical character recognition (OCR), and/or language translation. However, these data processing procedures are not error free, and often result in erroneous characters and words, or even illegible text. Thus, an additional step of language error detection and corrections, such as spell checking and auto-correction, is needed.

Conventional spell checking and auto-correction are resource intensive computer operations that take large amount of central process unit (CPU) processing cycles and volatile memory space. In a mobile computing device, such as a smartphone, both CPU capacity and memory space are much more limited in comparison to regular computers. On the other hand, the user experience of spell checking and auto-correction demands real-time performance and high level of accuracy. Therefore, there is a need for a better system and/or method for organizing and processing input text generated from raw data and dictionaries used to spell check and auto-correct the input text that has more efficient use of computing resources.

SUMMARY OF THE INVENTION

It is the objective of the present invention to provide a system and a method for organizing and processing a feature based data structure that can be used in linguistic spell checking and auto-correction. Such system and method, when implemented in electronic circuitries, have substantially lesser CPU and volatile memory space requirements than conventional spell checker and auto-correct software or devices.

In accordance to one aspect of the present invention, an original digital dictionary is first split into a plurality of sub-dictionaries. The split can be explicit or implicit. In the explicit split method, the content of an original digital dictionary is recognized for common features. One possible common feature is the frequently used characters, words, and phrases (high frequency words). Another common feature is the lengths of characters, words, and phrases. Other common features can be context sensitive, such as geographical attributes, branches of knowledge, sentiments, and levels of significance of the characters, words, and phrases. Then the original dictionary is explicitly split into two or more sub-dictionaries according to different values of the common feature as indexes. The sub-dictionaries may overlap each other by containing a number of same characters, words, and phrases, but each sub-dictionary is smaller in size than the original dictionary.

In one embodiment, the content in each sub-dictionary is organized to form a sub-dictionary hierarchy. For example, the characters, words, and phrases contained in each of the sub-dictionaries are organized in a hierarchical tree in which each of the top nodes contains the characters, words, and phrases with at least one common character, and each lower level node contains a subset of the characters, words, and phrases of the immediate node above having more common characters. As the hierarchical nodes progress downward, the subsets become smaller but with more commonalities, and eventually the bottom-most nodes contain only single characters, words, and phrases.

In another embodiment, one implicit split method is to first recognize the content of the original dictionary by determining a vector space for each of the characters, words, and phrases. A mathematical center for each vector space is calculated. The Unicode values of the characters, words, or phrases may be used in the vector determination. The sub-dictionaries are then generated, each containing the characters, words, and phrases having their vector-space centers within certain value range.

In accordance to another aspect of the present invention, an input data stream is processed to produce a human-readable text. In the case where the human-readable text contains one or more errors, one or more characters, words, or phrases in the proximity of each of the one or more errors is used to determine the selection feature in selecting the sub-directory in the case of explicitly split dictionary, or the selection vector-space center in the case of implicitly split dictionary. Then the one or more characters, words, or phrases in the proximity of each of the one or more errors, along with the errors, are used as an input; with the non-erroneous characters, words, or phrases serving as anchoring points for finding the matching character, word, or phrase in the sub-dictionary as output for correcting the errors. The comparison of the input characters, words, or phrases against the characters, words, and phrases in the sub-dictionary is performed transversely through the sub-dictionary hierarchical tree.

In one embodiment, the matching of characters, words, or phrases in the sub-dictionary is not necessary exact. A match can be found based on degree of similarity above a threshold, such as having a Unicode difference between the input character, word, or phrase and the candidate output that is within a Unicode distance. If a unique match is found for the input character, word, or phrase in a sub-dictionary, then the output is the matched character, word, or phrase in the sub-dictionary. However, it is possible that multiple matching candidate outputs can be found that are above the threshold of degree of similarity. In this case, a second round comparison may be performed with the threshold of degree of similarity adjusted upward meaning an even higher degree of similarity is demanded. This step can be repeated until only one resulting match is found for the output.

Since each sub-dictionary is smaller in size than the original dictionary and that only the selected sub-dictionary is used for the matching of input characters, words, or phrases, the volatile memory space used for loading the selected sub-dictionary is smaller than the loading of the entire original dictionary. This achieves one of the objectives of the present invention of requiring less volatile memory space than conventional spell checker and auto-correct software or devices. Because the content of the sub-dictionary is organized in a hierarchal structure, it allows the implementation of highly efficient searching algorithms for the input character, word, or phrase comparison against the sub-dictionary; as such, the other objective of the present invention is achieved.

The present invention can be adopted for all written languages, including those of alphabets, syllabries, and logographies categories. Embodiments of the system and method for organizing and processing a feature based data structure in accordance to the present invention can also apply to data types other than written languages, such as images and sounds.

BRIEF DESCRIPTION OF THE DRAWINGS

Embodiments of the invention are described in more details hereinafter with reference to the drawings, in which.

DETAILED DESCRIPTION

In the following description, systems and methods for organizing and processing feature based data structures that can be used in linguistic spell checking and auto-correction and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
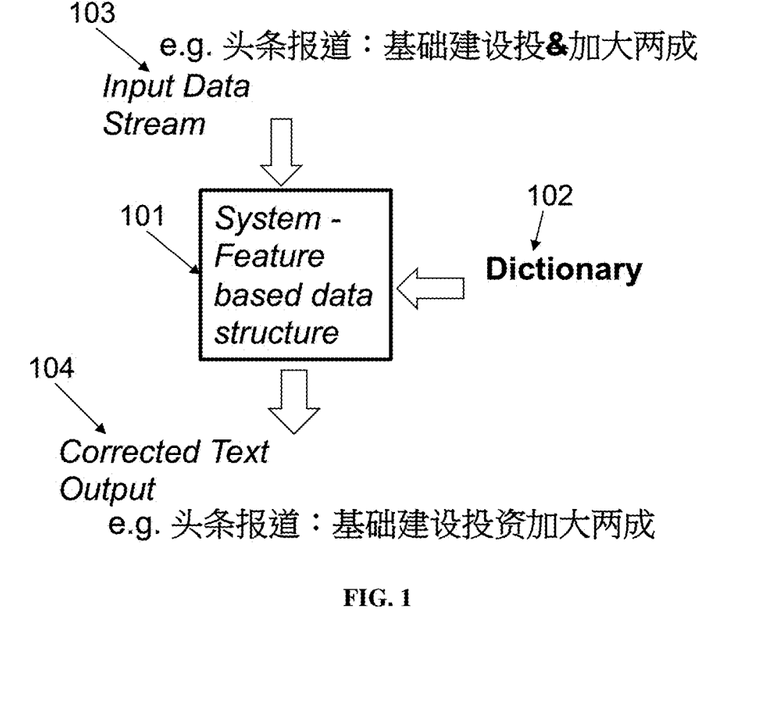
FIG. 1 depicts a logical block diagram of the system for organizing and processing feature based data structures used in linguistic spell checking and auto-correction in accordance to one embodiment of the present invention.

Referring to FIG. 1. In accordance to one embodiment of the present invention, the system for organizing and processing feature based data structure is implemented in a computing device 101, which can be a mobile computing device, which includes at least a specially configured CPU and sufficient volatile and non-transient memories for executing and storing the machine instructions in performing the method process. The system takes a dictionary 102, which may be stored in a non-transient memory space for organization processing, and an input data stream 103, which has been processed and converted into human-readable text but contains one or more error in real-time or non-real-time, and output the corrected human-readable text output 104. In accordance to another embodiment, the method for organizing and processing feature based data structure is implemented as set of machine instructions (or software module(s)) that can be executed by specially purposed or general purposed CPU.

In accordance to one aspect of the present invention, an original digital dictionary is first split into a plurality of sub-dictionaries. The split can be explicit or implicit. In the explicit split method, the content of an original digital dictionary is recognized for common features. One possible common feature is the frequently used characters, words, and phrases (high frequency words). Another common feature is the lengths of characters, words, and phrases. Other common features can be context sensitive, such as geographical attributes, branches of knowledge, sentiments, and levels of significance of the characters, words, and phrases. Then the original dictionary is explicitly split into two or more sub-dictionaries based on different values of the common feature. The sub-dictionaries may overlap each other by containing a number of same characters, words, and phrases, but each sub-dictionary is smaller in size than the original dictionary.

Figure 2:
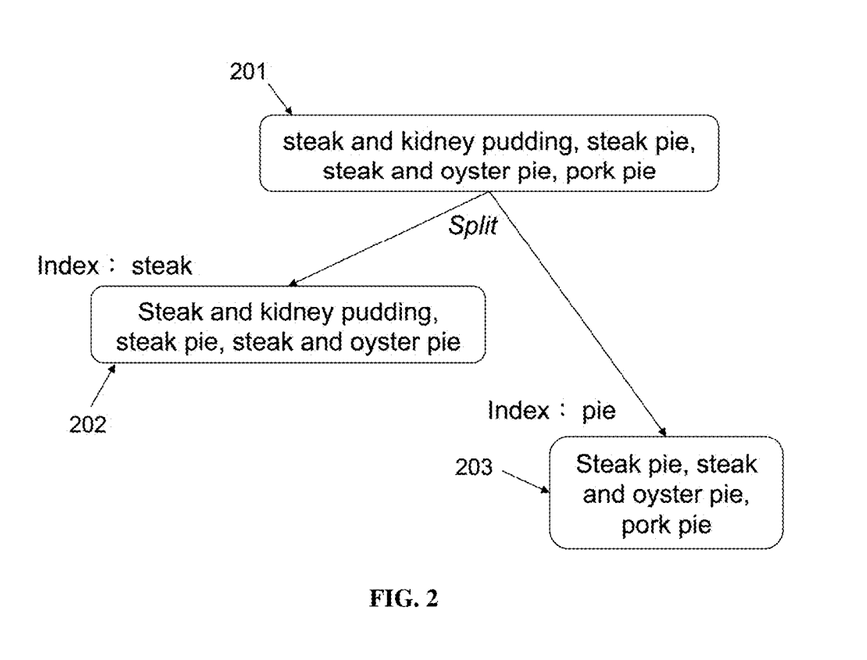
FIG. 2 depicts a logical block diagram of splitting an example English dictionary into sub-dictionary by an explicit split method in accordance to one embodiment of the present invention.

Referring to FIG. 2 as an example to illustrate the explicit splitting of an original dictionary into two sub-dictionaries based on the common feature of high frequency words. In this example, the original dictionary 201 contains the words and phrases: "steak and kidney pudding;" "steak pie;" "steak and oyster pie;" and "pork pie." The two high frequency words selected are "steak" and "pie". After the explicit split, a first sub-dictionary 202 contains the words and phrases: "steak and kidney pudding;" "steak pie;" and "steak and oyster pie;" and a second sub-dictionary 203 contains the words and phrases: "steak pie;" "steak and oyster pie;" and "pork pie."

Figure 3:
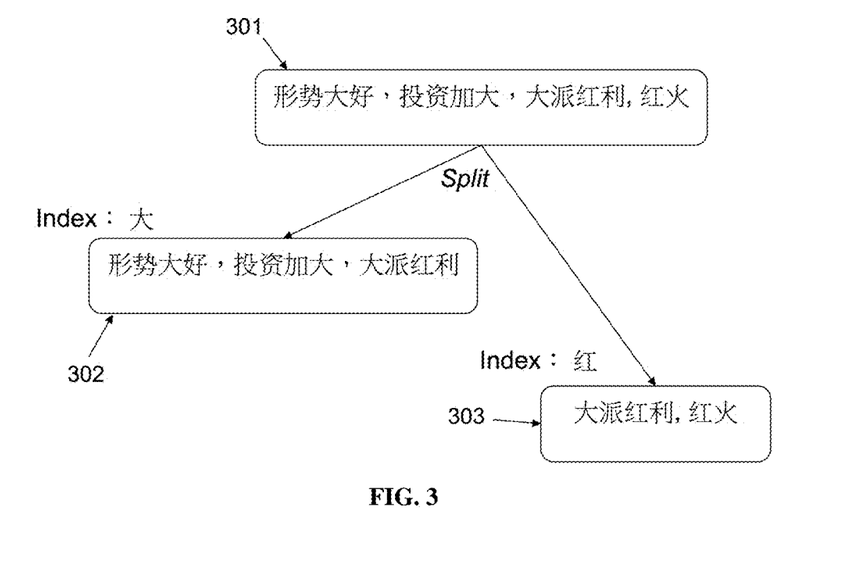
FIG. 3 depicts a logical block diagram of splitting an example Chinese dictionary into sub-dictionary by an explicit split method in accordance to one embodiment of the present invention.

Referring to FIG. 3 as another example to illustrate the explicit splitting of an original dictionary in the Chinese language into two sub-dictionaries based on the common feature of high frequency words. In this example, the original dictionary 301 contains the words and phrases: "形势大好;" "投资加人;" "大派红利;" and "红火." The two high frequency words selected are "大" and "红". After the explicit split, a first sub-dictionary 302 contains the words and phrases: "形势大好;" "投资加大;" and "大派红利;" and a second sub-dictionary 303 contains the words and phrases: "大派红利;" and "红火."

In one embodiment, the content in each sub-dictionary is organized to form a sub-dictionary hierarchy. For example, the characters, words, and phrases contained in each of the sub-dictionaries are organized in hierarchical tree in which each of the top nodes contains the characters, words, and phrases with at least one common character, and each lower level node contains a subset of the characters, words, and phrases of the immediate node above having more common characters. As the hierarchical nodes progress downward, the subsets become smaller but with more commonalities, and eventually the bottom-most nodes contain only single characters, words, and phrases.

In another embodiment, one implicit split method is to first recognize the content of the original dictionary by determining a vector space for each of the characters, words, and phrases. A mathematical center for each vector space is calculated. The Unicode values of the characters, words, or phrases may be used in the vector determination. The sub-dictionaries are then generated, each containing the characters, words, and phrases having their vector-space centers within certain value range. For example, if most of the words and phrases in the original dictionary have four characters, then the vector space dimension is four. Then the Unicode of each of the characters in each of the words and phrases is the value of the vector in the vector space of its respective word or phrase. With four vectors and their values found, the four-dimensional vector-space center of the word or phrase is determined mathematically. Another embodiment uses K-means clustering technique for the implicit split.

Figure 4:
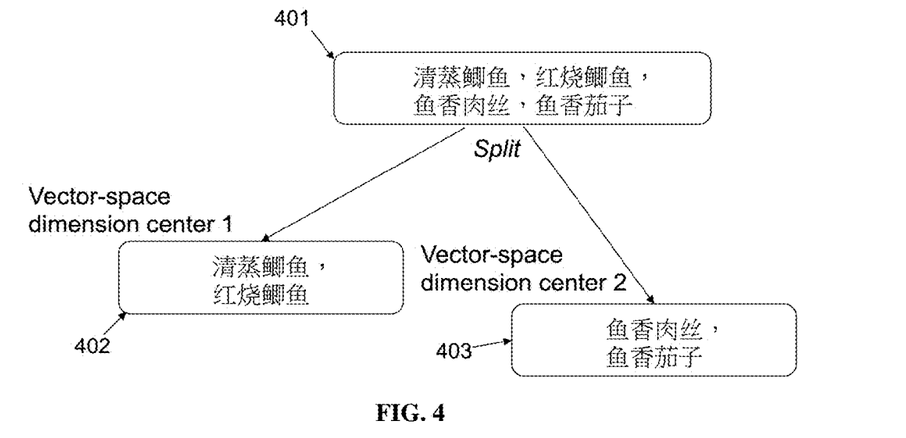
FIG. 4 depicts a logical block diagram of splitting an example Chinese dictionary into sub-dictionary by an implicit split method in accordance to one embodiment of the present invention.

Referring to FIG. 4 as an example to illustrate the implicit splitting of an original Chinese dictionary into two sub-dictionaries based on the common feature of high frequency words. The original dictionary 401, which contains the phrases: "清蒸鲫鱼;" "红烧鲫鱼;" "鱼香肉丝;" and "鱼香 茄子." are split into a first sub-dictionary 402 containing: "清蒸鲫鱼;" and "红烧鲫鱼" having a vector-space center: Center 1; and a second sub-dictionary 403 containing: "鱼香肉丝;" and "鱼香茄子" having a vector-space center: Center 2.

In accordance to another aspect of the present invention, an input data stream is processed to produce a human-readable text. In the case where the human-readable text contains one or more errors, one or more characters, words, or phrases in the proximity of each of the one or more errors is used as the selection feature in selecting the sub-directory in the case of explicitly split dictionary. In the case of implicitly split dictionary, the same method, i.e. vector dimension center or K-means, used in the implicit split is used for obtaining the sub-directory selection criteria. Then the one or more characters, words, or phrases in the proximity of each of the one or more errors, along with the errors, are used as an input; with the non-erroneous characters, words, or phrases serving as anchoring points for finding the matching character, word, or phrase in the sub-dictionary as output for correcting the errors. The comparison of the input characters, words, or phrases against the characters, words, and phrases in the sub-dictionary is performed transversely through the sub-dictionary hierarchical tree.

In one embodiment, the matching of characters, words, or phrases in the sub-dictionary is not necessary exact. A match can be found based on degree of similarity above a threshold, such as having a Unicode difference between the input character, word, or phrase and the candidate output that is within a Unicode distance threshold. If a unique match is found for the input character, word, or phrase in a sub-dictionary, then the output is the matched character, word, or phrase in the sub-dictionary. However, it is possible that multiple matching candidate outputs can be found that are above the threshold of degree of similarity. In this case, a second round comparison may be performed with the threshold of degree of similarity adjusted upward meaning an even higher degree of similarity is demanded. This step is repeated until only one resulting match is found for the output.

Figure 5:
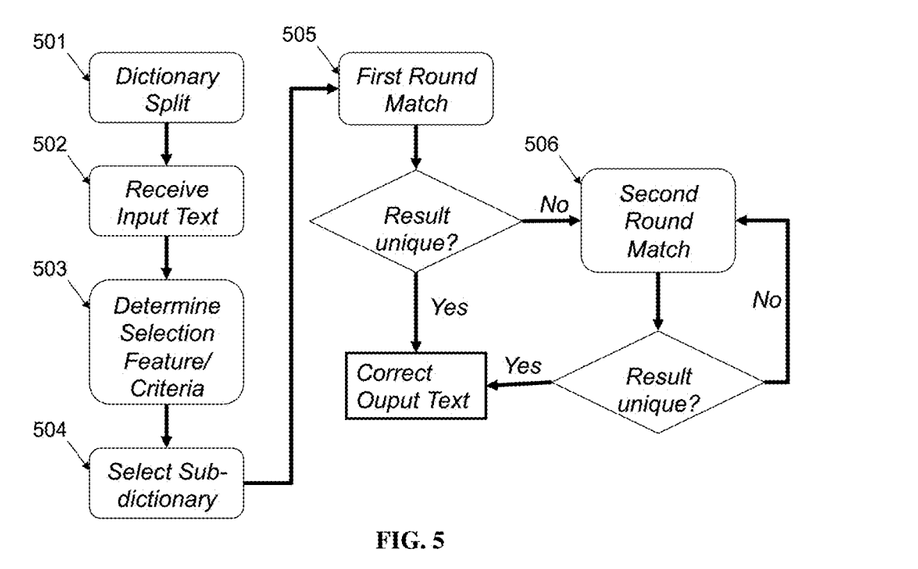
FIG. 5 shows a flow diagram of the method for organizing and processing feature based data structures used in linguistic spell checking and auto-correction in accordance to one embodiment of the present invention.

Referring to FIG. 5, which shows a flow diagram of the method for organizing and processing feature based data structures used in linguistic spell checking and auto-correction in accordance to one embodiment of the present invention. The method for organizing and processing feature based data structures used in linguistic spell checking and auto-correction comprises: (501) splitting an original dictionary into sub-dictionaries using an explicit split or implicit split method; (502) receiving an input human-readable text that contains one or more errors; (503) determining a sub-dictionary selection feature or selection criteria from the input text; (504) selecting the sub-dictionary based on the determined sub-dictionary selection feature or selection criteria; (505) executing a first matching of the one or more characters, words, or phrases in proximity of the errors against the characters, words, and phrases in the selected sub-dictionary; if a unique match is found, the resulting match is returned as an output; otherwise if multiple matching candidates are found (506) executing a second matching of the one or more characters, words, or phrases in proximity of the errors in the selected sub-dictionary with a raised threshold of degree of similarity; and repeat step 506 until a unique match is found.

Figure 6:
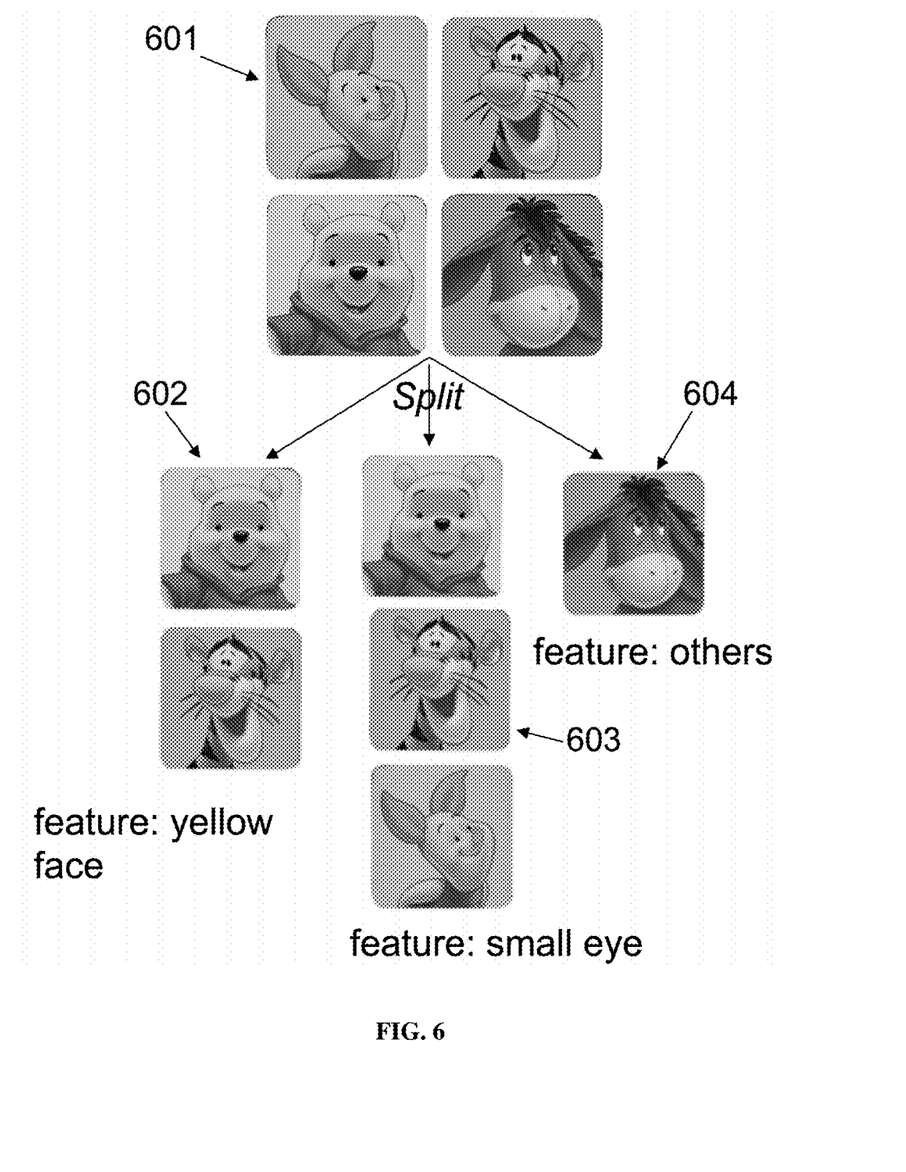
FIG. 6 depicts a logical block diagram of splitting an image collection into sub-collections by an explicit split method in accordance to one embodiment of the present invention.

The present invention can be adopted for all written languages, including those of alphabets, syllabries, and logographies categories. Embodiments of the system and method for organizing and processing a feature based data structure in accordance to the present invention can also apply to data types other than written languages, such as images and sounds. For example, FIG. 6 depicts a logical block diagram of splitting an image collection into sub-collections by an explicit split method in accordance to one embodiment of the present invention. An original image collection 601 is split into three subdirectories 602, 603, and 604 based on the common feature values: having yellow faces, having small eyes, and others respectively.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for organizing and processing feature based data structures in linguistic spell checking and auto-correction, comprising:
a computer processor configured to:
split an original dictionary into two or more sub-dictionaries using an explicit split or an implicit split based on a common feature of high frequency words, wherein each of the sub-dictionaries is smaller in size than the original dictionary and overlapping among the sub-dictionaries is allowed, and wherein contents in each of the sub-dictionaries are organized in a hierarchical tree;
receive an input human-readable text that contains one or more errors;
determine a sub-dictionary selection feature or selection criteria from the input human-readable text;
select the sub-dictionary based on the determined sub-dictionary selection feature or selection criteria;
execute a first matching of one or more characters, words, or phrases in proximity of the errors in the input human-readable text against the characters, words, and phrases in the selected sub-dictionary, wherein a match is found if a similarity between the one or more characters, words, or phrases in proximity of the errors in the input human-readable text and a candidate matching character, word, or phrase in the sub-dictionary is above a threshold of degree of similarity;
if a unique match is found, return the uniquely matching character, word, or phrase from the selected sub-dictionary as an output to correct the errors;
otherwise if more than one candidate matches are found, execute a second matching of one or more characters, words, or phrases in proximity of the errors in the input human-readable text against the character, word, and phrase in the selected sub-dictionary with the threshold of degree of similarity raised; and repeat the second matching until a unique match is found and the uniquely matching character, word, or phrase from the selected sub-dictionary is returned as an output to correct the errors.

2. The system of claim 1, wherein the explicit split comprises:
recognizing the common feature of high frequency words among characters, words, and phrases in the original dictionary; and
splitting the characters, words, and phrases in the original dictionary into the two or more sub-dictionaries according to different values of the recognized common feature of high frequency words.

3. The system of claim 1, wherein the implicit split comprises:
determining a vector space for each character, word, and phrase in the original dictionary using Unicode values of the character, word, and phrase;
determining a center value of the vector space for the character, word, and phrase in the original dictionary; and
splitting the characters, words, and phrases in the original dictionary into the two or more sub-dictionaries such that each sub-dictionary contains the characters, words, and phrases having their vector-space centers within certain value range.

4. The system of claim 1, wherein the first matching and the second matching are performed by determining a Unicode difference between the one or more characters, words, or phrases in the proximity of the errors in the input human-readable text and the character, word, and phrase in the selected sub-dictionary under comparison.

5. A method for organizing and processing feature based data structures in linguistic spell checking and auto-correction, comprising:
splitting an original dictionary into two or more sub-dictionaries using an explicit split or an implicit split based on a common feature of high frequency words, wherein each of the sub-dictionaries is smaller in size than the original dictionary and overlapping among the sub-dictionaries is allowed, and wherein contents in each of the sub-dictionaries are organized in a hierarchical tree;
receiving an input human-readable text that contains one or more errors;
determining a sub-dictionary selection feature or selection criteria from the input human-readable text;
selecting the sub-dictionary based on the determined sub-dictionary selection feature or selection criteria;
executing a first matching of one or more characters, words, or phrases in proximity of the errors in the input human-readable text against the characters, words, and phrases in the selected sub-dictionary, wherein a match is found if a similarity between the one or more characters, words, or phrases in proximity of the errors in the input human-readable text and a candidate matching character, word, or phrase in the sub-dictionary is above a threshold of degree of similarity;
if a unique match is found, returning the candidate matching character, word, or phrase from the selected sub-dictionary as an output to correct the errors;
otherwise if more than one candidate matches are found, executing a second matching of one or more characters, words, or phrases in proximity of the errors in the input human-readable text against the character, word, and phrase in the selected sub-dictionary with the threshold of degree of similarity raised; and repeating the second matching until a unique match is found and the uniquely matching character, word, or phrase from the selected sub-dictionary is returned as an output to correct the errors.

6. The method of claim 5, wherein the explicit split comprises:
recognizing the common feature of high frequency words among characters, words, and phrases in the original dictionary; and
splitting the characters, words, and phrases in the original dictionary into the two or more sub-dictionaries according to different values of the recognized common feature of high frequency words.

7. The method of claim 5, wherein the implicit split comprises:
determining a vector space for each character, word, and phrase in the original dictionary using Unicode values of the character, word, and phrase;
determining a center value of the vector space for the character, word, and phrase in the original dictionary; and
splitting the characters, words, and phrases in the original dictionary into the two or more sub-dictionaries such that each sub-dictionary contains the characters, words, and phrases having their vector-space centers within certain value range.

8. The method of claim 5, wherein the first matching and the second matching are performed by determining a Unicode difference between the one or more characters, words, or phrases in the proximity of the errors in the input human-readable text and the character, word, and phrase in the selected sub-dictionary under comparison.

\* \* \* \* \*